(12) United States Patent
Dohrmann

(10) Patent No.: US 6,669,179 B2
(45) Date of Patent: Dec. 30, 2003

(54) IMPACT DAMPER

(75) Inventor: Wolfgang Dohrmann, Eitorf (DE)

(73) Assignee: ZF Boge GmbH, Bonn (DE)

( * ) Notice: Subject to any disclaimer, the term of this patent is extended or adjusted under 35 U.S.C. 154(b) by 0 days.

(21) Appl. No.: 10/202,545

(22) Filed: Jul. 24, 2002

(65) Prior Publication Data

US 2003/0019699 A1 Jan. 30, 2003

(30) Foreign Application Priority Data

Jul. 25, 2001 (DE) .......................................... 101 36 302

(51) Int. Cl.$^7$ ................................................. F16M 1/00
(52) U.S. Cl. ........................ 267/139; 188/376; 188/377; 188/314; 293/134; 267/116
(58) Field of Search ................................. 188/371, 376, 188/377, 314, 266.2, 266.1, 322.19; 267/64.11, 139, 116; 293/134

(56) References Cited

U.S. PATENT DOCUMENTS

| | | | | |
|---|---|---|---|---|
| 4,255,986 A | * | 3/1981 | Mukoyama | ................. 188/377 |
| 4,641,872 A | * | 2/1987 | Lohr et al. | ................. 188/376 |
| 5,285,877 A | * | 2/1994 | Bonenberger et al. | ... 188/266.2 |
| 5,884,959 A | * | 3/1999 | Hillen | ................... 188/322.19 |
| 6,027,105 A | * | 2/2000 | Dohrmann et al. | ......... 267/139 |

* cited by examiner

Primary Examiner—Christopher P. Schwartz
Assistant Examiner—Melanie Torres
(74) Attorney, Agent, or Firm—Cohen, Pontani, Lieberman & Pavane

(57) ABSTRACT

Impact damper as a connecting member between a bumper and a chassis of a motor vehicle for the purpose of damping the shock loading during a collision between this motor vehicle and an obstacle, predominantly through gas-spring forces and deformation work. This impact damper includes an inner tube and an outer tube, which can be displaced telescopically one inside the other, thereby changing the volume of pressurized first and second gas spaces, at least one of the gas spaces being connected to an accumulator by a pneumatic feed line. An electrically controllable control valve, by means of which the air pressure in the gas spaces can be changed, can be arranged in the pneumatic feed line. The pressure in the gas spaces can be varied by a detection sensor system in the motor vehicle, which controls a control valve and adapts the pressure to the expected momentum of the collision. It is possible for a deformation element to be displaced as well to absorb a high impact energy by deformation work.

8 Claims, 1 Drawing Sheet

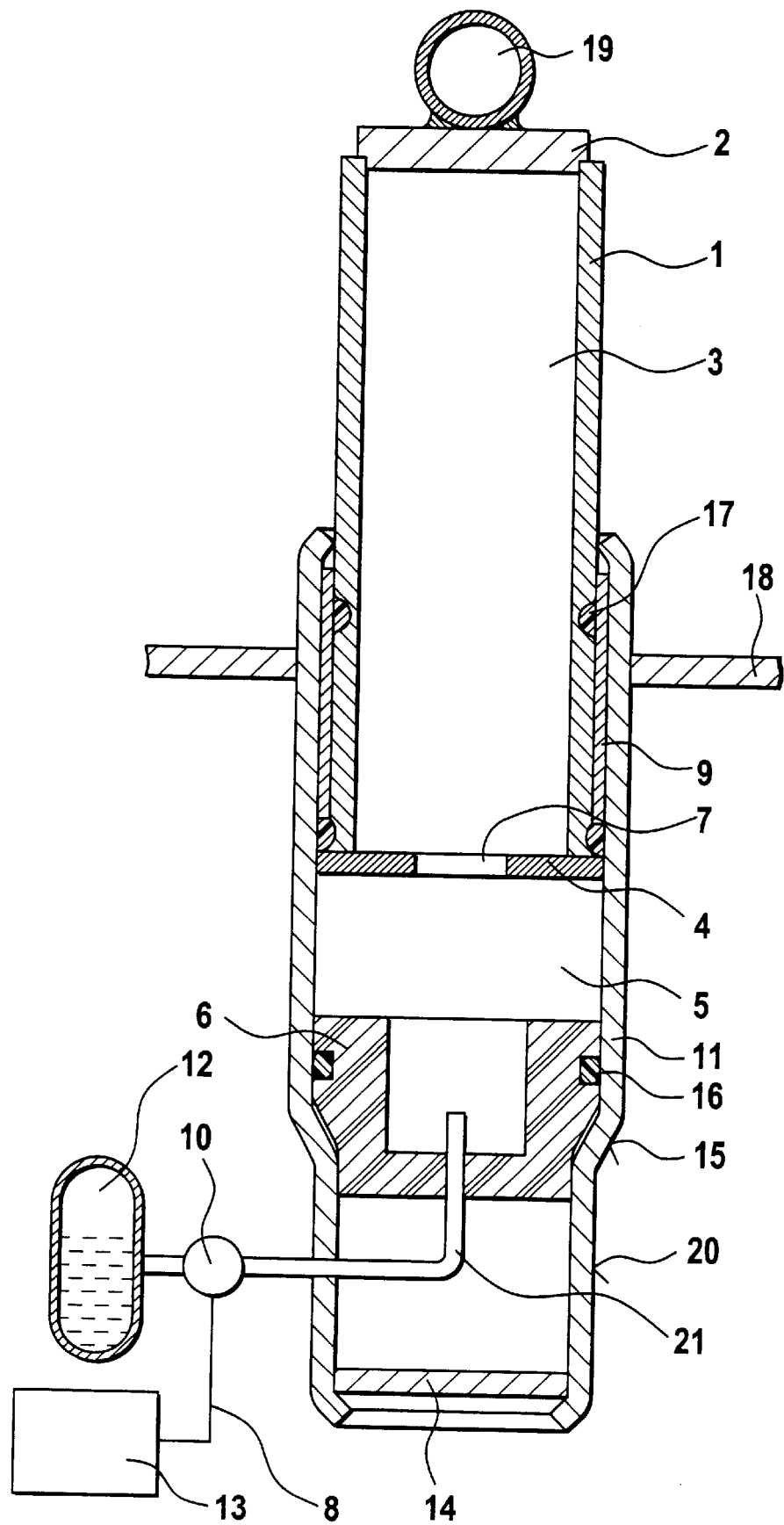

IMPACT DAMPER

BACKGROUND OF THE INVENTION

1. Field of the Invention

The invention relates to an impact damper as a connecting member between a bumper and a chassis of a motor vehicle for the purpose of damping the shock loading during a collision between this motor vehicle and an obstacle, predominantly through gas-spring forces and deformation work. This impact damper includes an inner tube which can be displaced telescopically inside an outer tube, thereby changing the volume of pressurized gas spaces. It is possible for a deformation element to be displaced as well to absorb high impact forces through deformation work.

2. Description of the Related Art

Impact dampers of this kind are known as low-cost embodiments since they do not have a hydraulic component that, as regards their damping action, could oppose a shock load with a relatively high resistance with a relatively steep progression. Impact dampers of this kind are designed in such a way that it is predominantly the mass of the vehicle itself that they cushion when it hits an obstacle. The primary concern here is to protect the components of the vehicle, not to protect the obstacle, which comprises not only parking automobiles, walls or trees but can also be a matter of two-wheeled vehicles or pedestrians. The gas spaces of conventional impact dampers are therefore preloaded with very high pressures in order to prevent permanent damage to the bumper and the chassis of the motor vehicle in the case of collision speeds of up to about 8 km/h. The inner tube is therefore pushed back into its initial position with the bumper by the gas pressure. However, as soon as this limiting speed is exceeded, permanent deformation of the impact damper occurs due to the fact that a deformation element is pushed into a constriction of the outer tube. During this process, a large amount of impact energy is absorbed by deformation work, thereby ensuring that the chassis is still protected as long as the collision speed does not exceed a second, higher limiting speed of, for example, 15 km/h. Admittedly, the impact absorbers and possibly also the bumper must then be replaced.

SUMMARY OF THE INVENTION

The impact damper according to the present invention likewise meets the specifications of the above-mentioned prior art, with the distinction that different pressures can be produced in the gas spaces of the impact damper, thereby allowing account to be taken of obstacles of very different types.

This consideration leads to the object of providing a low-cost impact damper with at least two gas spaces that reacts to obstacles with which the motor vehicle collides with a softer or harder setting, i.e. a lower or higher pressure in the gas spaces, depending on the mass of this obstacle.

According to the invention, an impact damper includes an inner tube and an outer tube, within which are arranged a first and a second gas space, which are separated from one another by a dividing piston with a restriction orifice. The inner tube is sealed off in a sliding manner by a sleeve and is mounted displaceably in the outer tube and connected to the dividing piston. The dividing piston thus forms the end of the inner tube, adjoining which the second gas space is formed in the outer tube, this gas space being bounded opposite the dividing piston by a deformation element, which is likewise sealed off with respect to the outer tube by a sealing ring and comes to rest on a diminution of the outer tube, which reduces the outer tube to a smaller diameter. The deformation element is pressed against the above-mentioned diminution by the high internal pressure in the gas spaces and remains in this position relative to the outer tube until a threshold impact loading is exceeded.

The second gas space is connected to an external accumulator via a pneumatic feed line and a control valve, enabling the second gas space and, together with the latter, via the restriction orifice, the first gas space, to be subjected to different pressures. The control valve, in turn, is connected by an electrical control line to a detection sensor system, by means of which it can be controlled electrically. These fittings of the impact damper are designed in such a way that they can be activated within fractions of a second and the impact-damper settings can be varied in such a way that the impact to be expected against the bumper of the motor vehicle can be taken in an optimum manner.

Nowadays, a detection sensor system in the motor vehicle is capable of detecting the size and mass of an obstacle while allowing for the speed of the motor vehicle and of converting them into electrical commands. These are fed to the control valve via the electrical control line and implemented, as described below.

In the case of collisions with low shock loading, the inner tube is pushed into the outer tube, the dividing piston moving toward the deformation element and thereby reducing the size of the second gas space. The gas charge of the second gas space, in turn, is thereby raised to an increased pressure and, as a result, the gas charge flows into the first gas chamber via the restriction orifice to equalize the pressure. If at all, the detection sensor system has increased the pressure in the gas spaces only to a level sufficient to enable the shock to be cushioned over the travel available to the dividing piston in the direction of the deformation element.

Once inward motion is finished, the gas spring formed by the excess pressure in the gas spaces ensures that the inner tube returns to its initial position before the collision.

Shock loads involving a higher momentum can be taken without destruction of the impact damper up to a certain level by virtue of the fact that the control valve is opened by the detection sensor system before the collision and the gas spaces are raised to the maximum pressure, converting the impact damper into a gas spring with an increased spring rate. Here too, the impact damper can cushion the momentum of the shock if the inner tube does not enter the outer tube further than the available travel of the dividing piston to the deformation element.

In the case of collisions with the highest shock loads, the inner tube and, with the latter, the dividing piston are pushed against the deformation element in the outer tube, with the result that the pressure in the gas spaces rises to a maximum as described above. Once this damping work has been exhausted, the dividing piston is pressed against the deformation element, which is pushed into the end of the tube of smaller diameter and absorbs deformation work, as a result of which the chassis of the motor vehicle may remain free from deformation and repair of the motor vehicle may be limited to replacement of the impact dampers and possibly of the bumper.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The sole figure is a cross-section of an impact damper according to the invention.

DETAILED DESCRIPTION OF THE PRESENTLY PREFERRED EMBODIMENTS

The figure shows a variable-length impact damper for a chassis of a motor vehicle in longitudinal section, an inner tube 1, closed off from the outside by a wall 2, enclosing a first gas space 3, which is provided with a gas charge under high pressure. Connected to the wall 2 and/or the inner tube 1 is a fastening element 19, which connects the impact damper to a bumper of the motor vehicle. The first gas space 3 is bounded at its end opposite the wall 2 by a dividing piston 4, which is connected to the end of the inner tube 1 and has a restriction orifice 7. The inner tube 1 is mounted displaceably in an outer tube 11 by means of a sleeve 9, a sealing ring 17 preventing pressure equalization with respect to the atmosphere. Adjoining the dividing piston 4 is a second gas space 5, which is arranged in the outer tube 11 and is bounded on the opposite side from the dividing piston 4 by a deformation element 6, which is likewise sealed off with respect to the outer tube 11 by a sealing ring 16. At the level of the deformation element 6, the outer tube 11 has a diminution 15, which reduces the outer tube 11 to a smaller diameter 20. An end wall 14, which should be understood as a seal to prevent penetration of dirt, can be arranged at the chassis end of the outer tube 11.

The impact damper is connected to the chassis of the motor vehicle by its outer tube 11 via a mounting flange 18, thereby establishing the connection with the bumper via the impact damper.

The second gas space 5 is connected to an accumulator 12, which is arranged outside the impact damper, by a pneumatic feed line 21 containing a control valve 10, which can be controlled by a detection sensor system 13 via an electrical control line 8.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. An impact damper for installation between a bumper and a chassis of a motor vehicle for damping shock loading during a collision between the motor vehicle and an obstacle, said impact damper comprising in inner tube having a first pressurized gas space, an outer tube having a second pressurized gas space, said inner tube being telescopically displaceable in said outer tube to change the volume of at least one of said gas spaces, a deformation element which can be displaced to absorb impact energy by deformation work when said impact energy exceeds a threshold, and an accumulator connected to at least one of said first and second pressurized gas spaces by a pneumatic feed line.

2. An impact damper as in claim 1 further comprising an electrically controllable control valve in said pneumatic feed line for controlling the pressure in at least one of said gas spaces.

3. An impact damper as in claim 2 further comprising a detection sensor system connected to said control valve by an electrical control line, said detection sensor system opening and closing said control valve in dependence on the magnitude of forces expected during the collision with an obstacle, whereby the damping action can be controlled.

4. An impact sensor as in claim 3 wherein said gas pressure is normally low, and is increased during a collision in proportion to the mass of the obstacle.

5. An impact damper as in claim 1 wherein said outer tube is formed with a diameter restriction into which said deformation element is pushed during high impact loading, thereby deforming said outer tube.

6. An impact damper as in claim 1 wherein said gas pressure in said spaces is sufficient to push the inner tube out of the outer tube after a collision, provided that said impact energy does not exceed said threshold.

7. An impact damper as in claim 1 further comprising a piston fixed to said inner tube and separating said gas spaces, said piston having a restriction orifice which permits gas to flow from said second space to said first space when said inner tube is telescopically displaced into said outer tube.

8. An impact damper as in claim 1 wherein said accumulator is connected to said second pressurized gas space by said pneumatic line.

* * * * *